No. 769,505. PATENTED SEPT. 6, 1904.
C. H. SPERLE.
INCUBATOR BROODER.
APPLICATION FILED JAN. 28, 1904.
NO MODEL. 2 SHEETS—SHEET 2.
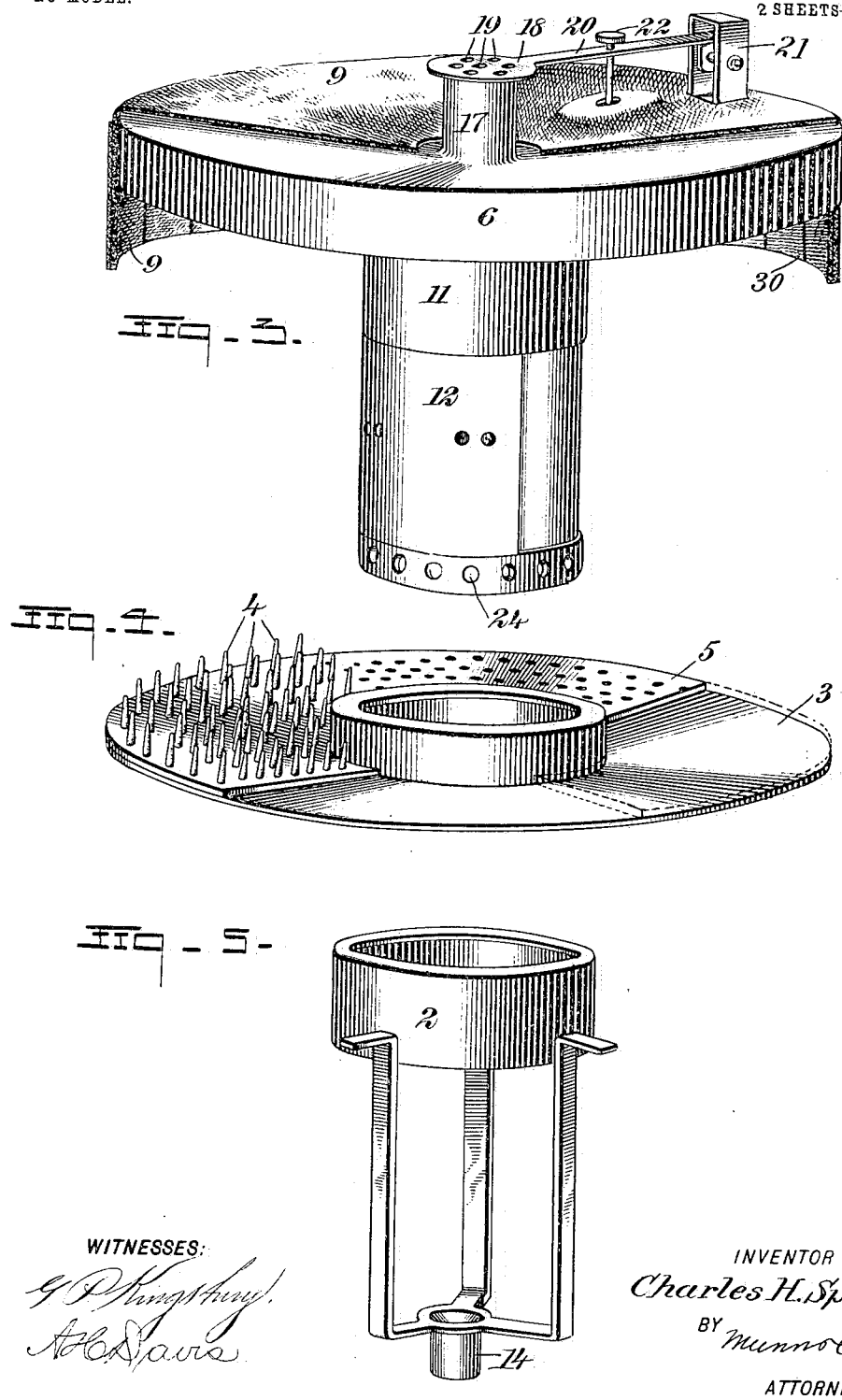

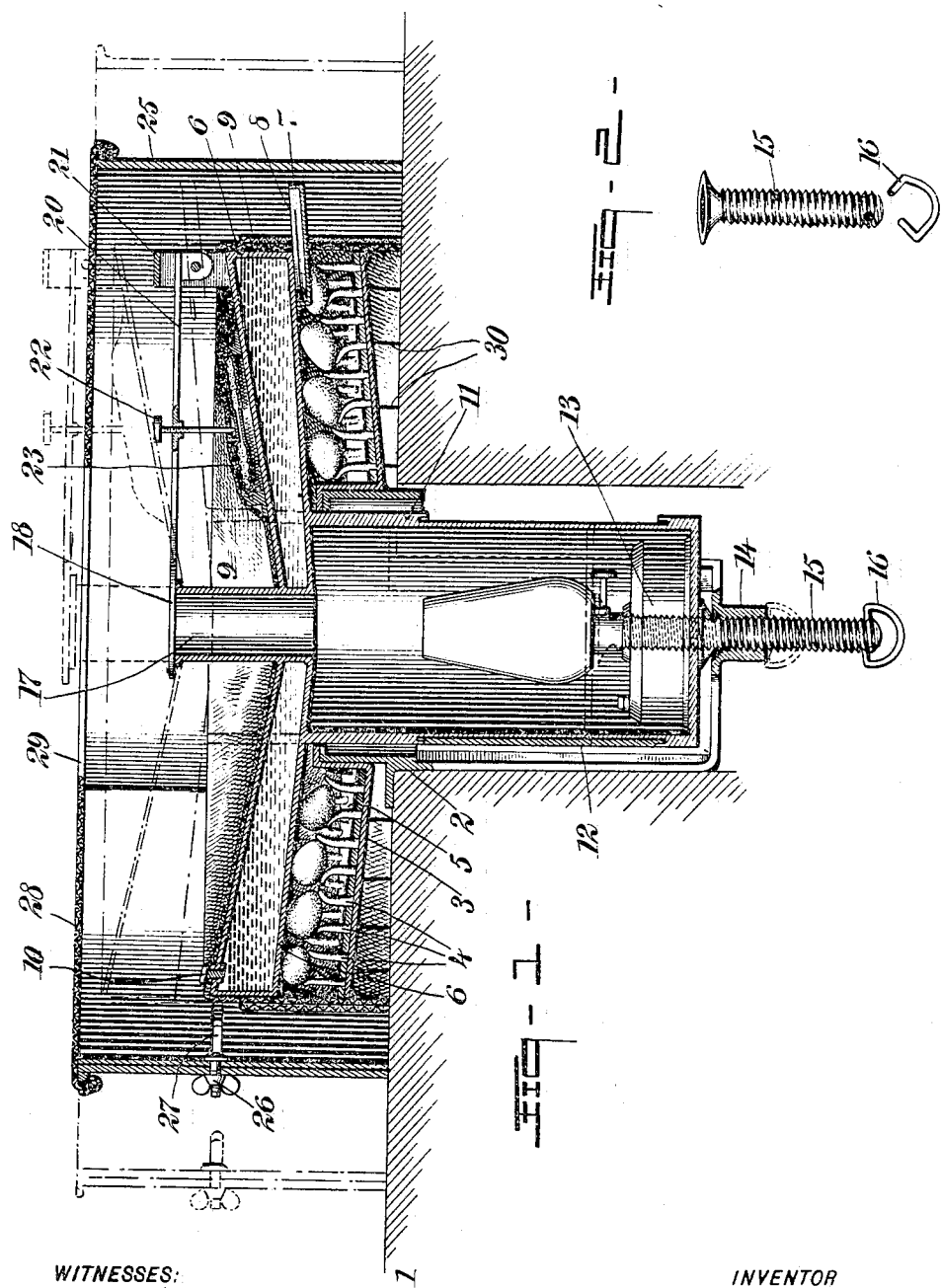

No. 769,505.

Patented September 6, 1904.

UNITED STATES PATENT OFFICE.

CHARLES H. SPERLE, OF BOUNDBROOK, NEW JERSEY.

INCUBATOR-BROODER.

SPECIFICATION forming part of Letters Patent No. 769,505, dated September 6, 1904.

Application filed January 28, 1904. Serial No. 190,974. (No model.)

*To all whom it may concern:*

Be it known that I, CHARLES H. SPERLE, a citizen of the United States, and a resident of Boundbrook, in the county of Somerset and State of New Jersey, have invented a new and Improved Incubator-Brooder, of which the following is a full, clear, and exact description.

My invention relates to devices for artificially hatching eggs and brooding the young birds during the first sixty days of their lives.

The objects of my invention are to secure as nearly as possible the actual conditions obtaining in the operation of hatching eggs naturally by the hatching-bird. I have discovered that the hatching-bird in addition to the operations of heating, rolling, and cooling the eggs also clutches them, while the air circulates around them without drafts, an operation which is not performed by any incubator heretofore known; and it is my object to secure this result in addition to the other results ordinarily obtained by incubators.

Further objects of my invention are to roll the eggs, regulate the temperature, provide for a circulation of air and at the same time prevent drafts, and to protect the young birds during the first sixty days of their lives.

Reference is to be had to the accompanying drawings, forming a part of this specification, in which similar characters of reference indicate corresponding parts in all the figures.

Figure 1 represents a central sectional view of one form of my invention. Fig. 2 is a detail of a part thereof. Fig. 3 is a perspective view of the casing and of the heating device and water-tank. Fig. 4 is a perspective view of the nest or egg-holding device with parts removed, and Fig. 5 is a perspective view of the bracket for holding the whole apparatus.
In the drawings, 1 represents the floor of the building upon which the incubator-brooder is to be placed. In a hole or depression in this floor is placed a bracket 2, preferably a skeleton bracket, provided with projections for holding the parts of the apparatus.

3 is a floor for the main part of the incubator, from which project a large number of studs 4, formed of flexible material—for example, rubber—which are adapted to hold the eggs, as shown. Upon the floor 3 surrounding these studs may be placed a covering 5, forming a double floor for the device. Above this arrangement, which is the equivalent of a nest, is placed a water-tank 6, which is formed, as shown, circular in plan view and of tapering cross-section from the outside inward. Extending into the chamber formed between the water-tank and the nest is a thermometer-casing 7, carrying a thermometer 8, its bulb resting up against the bottom of the water-tank. Placed over the top of the water-receptacle and hanging down its sides will be placed a textile covering 9, preferably of wool, which may be lined with asbestos on top and will hang freely at the bottom for a purpose to be described. It is preferably made of two thicknesses, the outer one whole and the inner one having slits 30 at the bottom to permit the passage of the young birds.

In the top of the water-tank is formed an opening through which water may be introduced, said opening being provided with a removable stopper 10. Extending from the bottom of the tank 6 is a cylindrical projection 11, having a sliding door 12 and resting on the bottom of the bracket 2, which carries a lamp 13 or other heating device. At the bottom of the bracket 2 is a screw-threaded projection 14, through which passes a screw 15, having a removable stop 16 attached to the bottom thereof. This screw bears upon the bottom of the casing 11, which supports the lamp, and is intended to be operated by means of the stop 16 to raise and lower the casing, taking with it the lamp, the water-tank, the cloth covering, and the other devices carried thereby.

17 is a flue extending upwardly from the chamber formed by the projection 11 and through the water-tank. Upon the top of this flue is a damper 18, provided with holes 19 to prevent its being entirely closed and stopping the draft. This damper is attached to a bar 20, pivoted in a bracket 21, attached at a convenient point to the tank 6. Passing through this bar is a screw 22, which is in contact with and operated by a thermostat 23 of ordinary construction. In the bottom of the casing 11 are series of holes 24 for admitting air to the heating device to support combustion.

The trainer consists of a cylindrical or other shaped metallic casing 25, having fastening devices (represented by 26) which are adjustable in slots 27 for the purpose of expanding and contracting the casing. The trainer is covered with a piece of cloth 28, preferably cheese-cloth, having an opening 29 at its center for the purpose of allowing the products of combustion to pass upward. From this construction it will be seen that the eggs will rest upon the studs 4 and will be pressed upon by the bottom of the water-tank 6, and thus clutched and held in position. Eggs of various sizes may be contained in a single apparatus of this kind, because the studs being of flexible material will accommodate themselves to the sizes of the eggs, and, moreover, each egg will be clutched, as described, irrespective of the other eggs and of the varying sizes of the eggs. The water-tank will furnish the necessary heat and from its dished or tapering shape will provide an even temperature throughout the apparatus. The cloth 9 will permit a circulation of air through its meshes, but will effectually prevent any draft from reaching the eggs. The thermostat, which may be readily regulated by operation of the screw 22 so that the damper will be raised or lowered, according to the temperature produced by the hot water, is also placed so as to be influenced by the outside temperature. When expanded by a rise in temperature, the thermostat will also tend to raise the cloth 9 slightly, and thus have an additional regulating influence upon the temperature within. The whole device, except the nest itself, can be readily raised by the screw 15, as described, to permit the necessary operations of placing and removing the eggs, &c.

A very important feature of my invention consists in making the water-tank rotatable over the eggs, which operation will obviously roll the eggs in order to present the different parts into close proximity to the water-tank. This construction will produce the closest approximation to the conditions actually existing in the natural incubation of eggs and will as a rule result, as has been demonstrated by experiment, in the incubation of one hundred per cent. of the fertile eggs introduced into it.

An incubator-brooder constructed as described can be made chiefly of thin metal, which will make it light and inexpensive to ship.

When the birds are hatched, they will readily find their way outside the cover 9, especially when the upper part is lifted by means of the screw 15, and they must then be protected by a trainer. The preferred form of trainer shown in the accompanying drawings will at first be contracted to the smallest position possible, allowing the young birds a very small space only in order to prevent too much movement on their part during the first two or three days. Afterward the trainer may be enlarged, the cheese-cloth 28 being removed to afford larger space for the birds to run in, as indicated in dotted lines in Fig. 1. The cheese-cloth cover will permit a flow of fresh air and prevent drafts within the trainer, but will permit the passage of a front light, which will be the proper condition for the birds during the first period. The trainer will allow the young birds to gradually move from the temperature at which the eggs were hatched to the temperature in which they are to live afterward without any sudden changes and without the possibility of being affected by drafts. After a few days the trainer is removed and the young birds are at liberty to run about in the vicinity of the incubator-brooder, which is to be their home for about two months.

Having thus described my invention, I claim as new and desire to secure by Letters Patent—

1. In an incubator-brooder, the combination of means for clutching and means for heating eggs, with an expansible frame.

2. In an incubator-brooder, the combination of means for clutching and means for heating eggs, with a trainer comprising an expansible frame, and a top adapted to be attached thereto, consisting of translucent material.

3. An incubator having means for clutching eggs, said means comprising means for yieldingly supporting the eggs.

4. An incubator having means for clutching eggs, comprising a series of flexible studs beneath the eggs, and a platform above the studs and bearing upon their upper surfaces.

5. In an incubator, the combination of means for clutching eggs, and means for rolling the eggs.

6. In an incubator, the combination of a heating device, a floor provided with laterally-flexible supports for the eggs, and a water-tank above the eggs and resting upon them.

7. An incubator having a supporting device for eggs, comprising a base, and a plurality of upwardly-projecting flexible studs.

8. In an incubator, the combination of means for yieldingly supporting eggs, a heating device, a rotatable hot-water tank resting on the eggs, and means for raising said heating device and hot-water tank from the eggs.

9. In an incubator, the combination of means for yieldingly supporting eggs, a heating device, a water-tank above the eggs, and a textile covering over said tank and extending around the outside portion of the egg-supporting means.

10. In an incubator, the combination of a heating device, means for clutching eggs, comprising a movable hot-water tank resting upon the eggs and laterally-yielding supports, and means for raising said heating device and hot-water tank from the eggs.

11. An incubator having a water-tank provided with top and bottom walls sloping downwardly from the edge toward the center.

12. An incubator having a water-tank provided with top and bottom walls sloping downwardly from the edge toward the center and converging in the same direction.

In testimony whereof I have signed my name to this specification in the presence of two subscribing witnesses.

CHARLES H. SPERLE.

Witnesses:
ALBERT E. FAY,
EVERARD BOLTON MARSHALL.